United States Patent [19]

Miyazaki

[11] 4,454,910

[45] Jun. 19, 1984

[54] HEAT RADIATION CONTROL DEVICE

[75] Inventor: Yoshiro Miyazaki, Tokyo, Japan

[73] Assignee: Tokyo Shibaura Denki Kabushiki Kaisha, Kawasaki, Japan

[21] Appl. No.: 323,077

[22] Filed: Nov. 19, 1981

[30] Foreign Application Priority Data

Dec. 3, 1980 [JP] Japan .................... 55-169499
Jul. 31, 1981 [JP] Japan .................... 56-120124

[51] Int. Cl.³ .................................. G05D 23/00
[52] U.S. Cl. ....................................... 165/32
[58] Field of Search ........................ 165/32, 32 H

[56] References Cited

U.S. PATENT DOCUMENTS

| B 529,194 | 3/1976 | Kroebig et al. | 165/32 H |
|---|---|---|---|
| 3,177,933 | 4/1965 | Webb | 165/32 |
| 3,225,820 | 12/1965 | Riordan | 165/32 |
| 3,390,717 | 7/1968 | Townsend | 165/32 |
| 3,399,717 | 9/1968 | Cline | 165/32 H |
| 3,463,224 | 8/1969 | Myers | 165/32 |
| 3,957,107 | 5/1976 | Altoz et al. | 165/32 H |
| 4,051,890 | 10/1977 | Melchior | 165/32 H |
| 4,273,183 | 6/1981 | Altoz et al. | 16/32 |
| 4,274,476 | 6/1981 | Garrett | 165/32 H |

FOREIGN PATENT DOCUMENTS

| 585483 | 12/1977 | U.S.S.R. | 165/32 |
|---|---|---|---|
| 605071 | 4/1978 | U.S.S.R. | 165/32 H |

*Primary Examiner*—William R. Cline
*Assistant Examiner*—John M. Kramer
*Attorney, Agent, or Firm*—Oblon, Fisher, Spivak, McClelland & Maier

[57] ABSTRACT

A heat radiation control device comprises a base plate with an apparatus as a heat generating body mounted on one face thereof, a radiating plate disposed on the other face side of said base plate at a given space therebetween, and a bellows having a contact plate facing the radiating plate and connected with the other face of said base plate, the container being capable of expanding and contracting so that the contact plate may be brought into contact with and separated from the radiating plate. A working fluid is sealed in the bellows to expand the bellows so that the contact plate may abut against the radiating plate to radiate heat through the radiating plate when the amount of heat from the apparatus transferred through the base plate exceeds a predetermined value.

5 Claims, 5 Drawing Figures

HEAT RADIATION CONTROL DEVICE

BACKGROUND OF THE INVENTION

1. Field of the Invention

This invention relates to a heat radiation control device for controlling the temperature of an apparatus which is used in a vacuum and produces heat during operation.

2. Description of the Prior Art

Since discharge of heat in a vacuum, especially in space, is made only by radiation, it is hard to control the quantity of radiant heat to maintain apparatus at a given temperature. In a conventional method of heat radiation control, for example, an apparatus is provided with a radiating surface to radiate the maximum quantity of heat produced by the apparatus, and, if the quantity of heat produced by the apparatus is not large enough, the temperature of the apparatus is controlled by adjusting the quantity of produced heat with use of an auxiliary heat source, such as an electric heater, to match it to the quantity of radiant heat.

In space, however, the available electric power is often limited, so that there is conventionally used a thermal louver including no electric heater, as shown in FIG. 1.

In FIG. 1, numeral 1 designates a base plate the under surface of which is fitted with main and auxiliary bellows 2 and 3 with a space between them. The respective lower ends of these bellows 2 and 3 are pivotally mounted on a horizontal arm portion of an L-shaped swing lever 4 with its bent portion pivotally supported. Numeral 5 designates a horizontal coupling rod on which a plurality of louver members 6 are pivotally mounted at regular intervals. When one of these louver members 6, which is pivotally mounted on the bottom end of a vertical arm of the swing lever 4, is rocked, the remaining louver members 6 are also rocked through the same angle with the aid of the coupling rod 5. Numeral 7 designates a tension spring for urging the swing lever 4 to rock clockwise.

In the thermal louver of the aforementioned construction, a working fluid in the main bellows 2 is expanded by heat which is produced by an apparatus (not shown) mounted on the base plate 1 and is transferred through the base plate 1. Accordingly, the main bellows 2 is extended to rock the swing lever 4 counterclockwise. As a result, all the louver members 6 are rocked counterclockwise through an angle corresponding to the degree of extension of the main bellows 2, that is, the louver is opened to start heat radiation from the base plate 1. Thus, the opening of the louver members 6 is adjusted for the control of the temperature of the apparatus.

The thermal louver of this type, however, constitutes quite a complicated radiant heat transfer system, and it has been difficult to work out a thermal design in consideration of external incident light. To avoid such difficulty, the louver is covered with a flat radiating surface to simplify the influence of the external incident light. In this case, however, the radiating surface would retard direct heat radiation from the base plate to deteriorate the efficiency of heat radiation.

SUMMARY OF THE INVENTION

The object of this invention is to provide a heat radiation control device with a simple heat transfer system, capable of enjoying a high-accuracy thermal design and satisfactory heat radiation efficiency.

In a heat radiation control device according to this invention, a base plate on which an apparatus constituting a heat source is mounted and a radiating plate for heat radiation are fixed with a given space between them, and a flexible container in which a working fluid is sealed is disposed between these plates. When the vapor pressure inside the container is increased by heat from the apparatus, the container is brought into contact with the radiating plate, and the heat from the apparatus is transmitted through the working fluid in the container to the radiating plate and radiated therefrom. When the temperature of radiant heat from the apparatus is lowered, on the other hand, the container is contracted to be separated from the radiating plate, and the heat radiation is stopped. By the repetition of such contact and separation between the container and the radiating plate, the apparatus is maintained in a fixed range of temperature.

In the device of this type, the space between the container and the radiating plate can easily be set so that the flexibility of the container may match the vapor pressure of the working fluid, and the base plate temperature can be controlled with high accuracy by such setting.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Now there will be described a heat radiation control device according to an embodiment of this invention with reference to the accompanying drawings.

Figure 1:
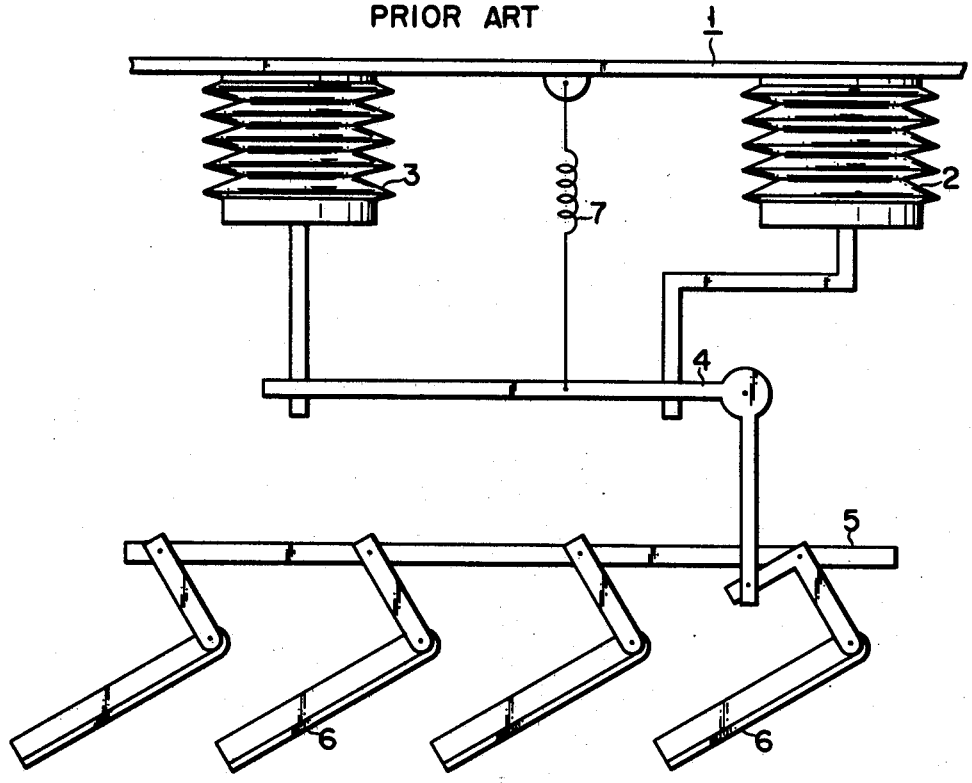
FIG. 1 is a schematic view of a prior art heat radiation control device.
Figure 2:
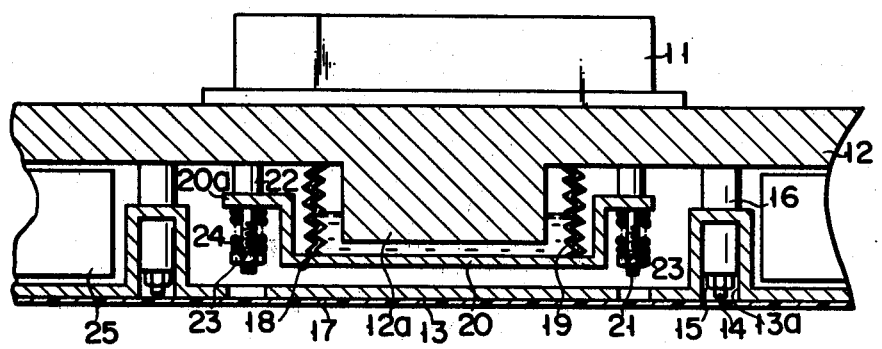
FIG. 2 is a sectional view of a heat radiation control device according to an embodiment of this invention.

In FIG. 2, numeral 11 designates an apparatus as a heat source formed of e.g. a power source which is fixed on the inner face of a base plate 12 formed of a metal capable of satisfactory heat conduction, such as aluminum. The base plate 12 may constitute or may be attached to one side wall of the housing of e.g. a space craft. A radiating plate 13 formed of a metal capable of satisfactory heat conduction, such as aluminum, is disposed on the outer side of the base plate 12 to face the same with a given space between them. The radiating plate 13 is fixed to the base plate 12 by means of bolts 14 protruding from the base plate 12 and nuts 15, and is thermally isolated from the base plate 12 by means of spacers 16 of glass epoxy resin which are interposed between the plates 12 and 13 and penetrated severally by the bolts 14. Recesses 13a are formed in the outer face of the radiating plate 13 to contain the tips of the bolts 14 and the nuts 15, severally. Thus, no projections exist on the outer surface of the radiating plate 13, and it is easy to cover such surface with a film 17 made of a material which reflects sunlight and radiates heat.

The basal end of a sealed container 18 capable of expansion and contraction relative to the position of the radiating plate 13 is attached to the outer surface of the base plate 12. The container 18 is composed of a bellows 19 with a circular cross section one end of which is fixed to the outer surface of the base plate 12, and a contact plate 20 attached to the other end of the bellows 19 so as to block up the opening of the bellows 19. The contact plate 20 is formed of a metal capable of good heat conduction, such as aluminum, and is disposed so that its outer surface is located in parallel with the inner surface of the radiating plate 13 at a given distance therefrom. The outer surface of the contact plate 20 is worked for a high degree of smoothness. Formed around the contact plate 20 is a circular flange 20a which extends from the outer circumference of the bellows 19. The flange 20a has holes through which bolts 21 protruding from the base plate 12 are loosely inserted. Each of these bolts 21 penetrates a spacer 22 interposed between the base plate 12 and the flange 20a to keep the space between them fixed. A nut 23 is screwed on the tip of the bolt 21 protruding from the flange 20a. Interposed between the nut 23 and the flange 20a is a compression spring 24 surrounding the bolt 21, whereby the contact plate 20 is urged toward the base plate 12.

A discoid projection 12a is formed on the inner face of the base plate 12 so as to be located inside the bellows 19. The dimensions of the projection 12a are so determined that there may be given a circular space between its circumferential surface and the inner surface of the bellows 19 and between its end face and the inner surface of the contact plate 20. Sealed in the container 18 is a working fluid with a relatively high vapor pressure, such as Freon-114 (trade name).

In FIG. 2, numeral 25 designates a heat insulating material which fills the space between the base plate 12 and the radiating plate 13 for heat insulation between them.

Now there will be described the operation of the heat radiation control device of the aforementioned construction.

Heat produced by the apparatus 11 is transferred to the base plate 12 to heat the working fluid in the container 18. The state of vaporization of the working fluid varies with the heating temperature of the fluid. When the working fluid is heated, the vapor pressure inside the container 18 is increased to expand the bellows 19, thereby shifting the contact plate 20 toward the radiating plate 13. When the temperature of the working fluid reaches a set temperature, the bellows 19 further expands to bring the contact plate 20 into contact with the radiating plate 13. As a result, the heat from the base plate 12 is transmitted through the working fluid and the contact plate 20 to the radiating plate 13, where it is radiated to the outside. Thus, the apparatus 11 is cooled. When the apparatus 11 is cooled to a predetermined temperature or below, the vapor pressure of the working fluid inside the container is decreased to contract the bellows 19 by the agency of a resultant force or a combination of the spring forces of the bellows 19 and the compression springs 24, thereby reducing the contact pressure of the contact plate 20 on the radiating plate 13 or separating the contact plate 20 from the radiating plate 13. Thus, the contact plate 20 is repeatedly reciprocatively shifted to maintain the apparatus 11 in a fixed range of temperature. The setting of the fixed temperature of the apparatus 11 is achieved by vertically moving the nuts 23 along their corresponding bolts 21 to adjust the degree of compression of the compression spring 24.

If the influence of the force of gravity is ignored, a high-temperature portion of the working fluid inside the container 18, that is, a portion near the base plate 12, is liable to become gaseous, while a portion near the contact plate 20 tends to be liquid. Therefore, if the inner surface of the base plate 12 is flat without the projection 12a, it is liable to be covered entirely with a gaseous-phase fluid layer which is inferior to a liquid-phase fluid layer in heat conduction. Thus, the efficiency of heat transfer between the base plate 12 and the contact plate 20 may possibly deteriorate. If the projection 12a is formed on the inner surface of the base plate 12, however, the lower portion of the projection 12a will be immersed in the liquid-phase fluid to ensure satisfactory heat transfer between the base plate 12 and the contact plate 20 through the liquid-phase fluid.

Figure 3:
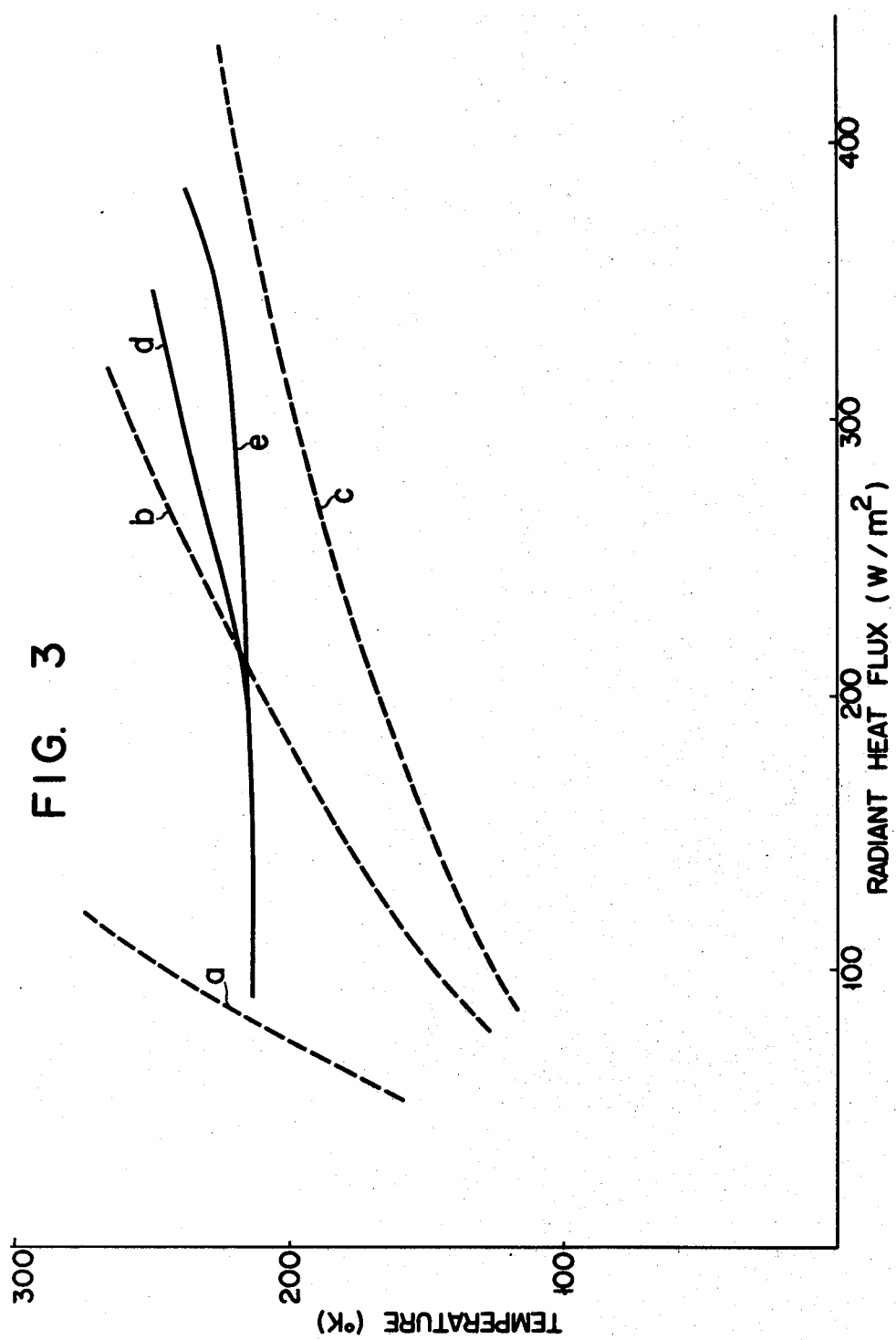
FIG. 3 is a diagram showing the results of a control test on the device shown in FIG. 2.

FIG. 3 shows results of an actual test on the temperature control of the apparatus using the heat radiation control device of the above-mentioned construction. In FIG. 3, the axes of ordinate and abscissa represent the apparatus temperature (°K.) and the radiant heat flux ($W/m^2$) of the heat radiated from the radiating plate, respectively. Further, broken-line curves a, b and c represent calculated values, while solid-line curves d and e indicate measured values. The curves a, b and c correspond to cases in which the contact plate is so designed as not to come in contact with the radiating plate, in which these two plates are allowed to be continuously in contact with each other with the apparatus disposed over the base plate as shown in FIG. 2, and in which the plates are allowed to be continuously in contact with each other with the apparatus disposed under the baseplate, respectively. The curves d and e represent measurement data for the cases in which the apparatus is disposed over and under the baseplate, respectively. The characteristics for the curves d and e are different because the liquid layer of the working fluid constitutes thermal resistance in the case of the curve d. In either case, however, it is to be understood that the temperature may be kept constant (at 210° K. to 220° K.) so long as the radiant heat flux is approximately 200 $W/m^2$ or less.

The dimensions of the device used in the measurement are as follows:
Diameter of the discoid projection 12a: 40 mm
Diameter of the discoid contact plate 20: 60 mm
Diameter of the circular effective area of the radiating plate 13: 100 mm
Space between the projection 12a and the contact plate 20 in contact with the radiating plate 13: 5 mm Although a single bulky projection 12a is formed on the base plate 12 in the aforementioned embodiment, a multitude of small projections may be arranged at regular or irregular intervals on the base plate 12. In this case, a multitude of projections are preferably formed on the inner surface of the contact plate 20 so as to be arranged among the aforesaid small projections on the base plate 12 at spaces therefrom to define a passage for the working fluid.

Figure 4:
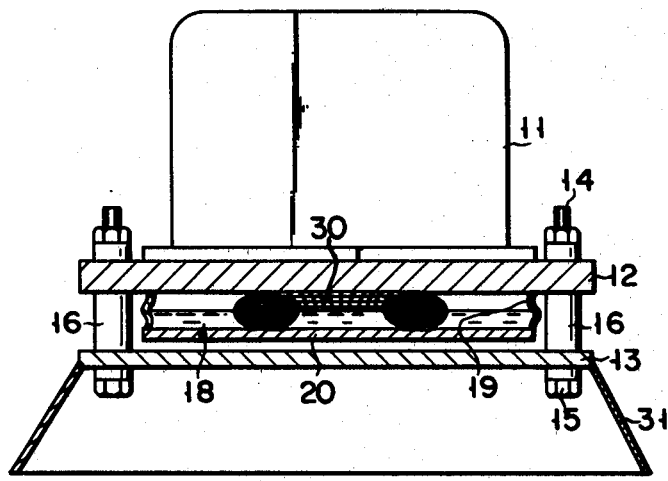
FIG. 4 is a sectional view of a heat radiation control device according to another embodiment of the invention.
Figure 5:
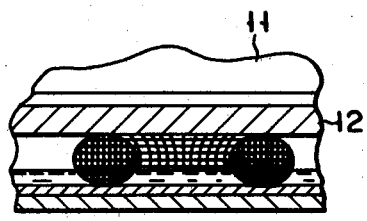
FIG. 5 is an enlarged sectional view showing part of FIG. 4.

Referring now to FIGS. 4 and 5, there will be described a heat radiation control device according to another embodiment of the invention. In the description to follow, like reference numerals are used to designate like portions throughout the Figures.

In a flexible container 18 composed of a bellows 19 and a contact plate 20, there is contained a doughnut-shaped working fluid guide 30 concentric with the bellows 19. The guide 30 is formed of a fine-mesh wire net made of fine wire and is rolled with a multitude of turns, leaving its central portion hollow. The upper and lower sides of the guide 30 are in contact with the outer and inner surfaces of a base plate 12 and the contact plate 20, respectively, and can expand and contact vertically, accompanying the expansion and contraction of the bellows 19. In FIG. 4, numeral 31 designates a reflecting plate spreading out from the radiating plate 31.

In the heat radiation control device shown in FIGS. 4 and 5, heat transferred from an apparatus 11 to the working fluid in the container 18 through the base plate 12 is delivered to a radiating plate 13 through the contact plate 20 by heat conduction accompanying the phase change of the working fluid. Namely, a liquid-phase portion of the working fluid near the contact plate 20 is automatically transmitted through the working fluid guide 30 toward the base plate 12 by capillarity, and heated near the base plate 12 by heat therefrom to be vaporized. Further, the resultant vapor is condensed into a liquid near the contact plate 20 and transfers heat to the contact plate 20. By such liquid-to-gaseous phase transition cycle, the heat from the base plate 12 is effectively transferred to the contact plate 20. This transition cycle of the working fluid never changes even in a weightless state. Accordingly, the heat generated at the apparatus 11 is radiated through the radiating plate 13 in contact with the contact plate 20 to keep the temperature of the apparatus 11 constant, irrespectively of the working conditions.

In the device shown in FIGS. 4 and 5, a wire net is used for the working fluid guide 30. Alternatively, however, the working fluid guide may be formed of any suitable material which can enjoy capillary action and can expand and contract with the container 18, for example, continuous plastic foam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heat radiation control device for maintaining the temperature of an apparatus as a heat source constant, comprising:
 a base plate wherein said apparatus is mounted on a first face of said base plate;
 a radiating plate disposed on a second face of said base plate;
 means for fixing said radiating plate at a predetermined space from said base plate;
 a container comprising a flange member with a hole formed therein, a contact member facing said radiating plate, said contact member connecting with said second face of said base plate; said container being capable of expanding and contracting such that said contact member is brought into contact with and separated from said radiating plate, and a working fluid chamber defined inside said container;
 a bolt and adjustable nut assembly wherein said bolt is fixedly attached to said base plate and inserted in said hole in said flange member;
 means for urging said container toward said baseplate, said means for urging being positioned on said bolt between said flange and said nut such that adjustment of said nut adjusts the urging force of said means for urging;
 a working fluid sealed in said working fluid chamber of said container for expanding said container against the urging force of said means for urging so that said contact member abuts against said radiating plate to radiate heat through said radiating plate when an amount of heat from said apparatus transferred through said base plate exceeds a predetermined value, and wherein said contact member further comprises a contact plate and a hollow bellows having a first end thereof coupled to said second face of said base plate and with a second end coupled to a first base of said contact plate, said working fluid chamber being fluid-tightly defined by said second face of said base plate, said first base of said contact plate and an inner peripheral surface of said bellows, and wherein said means for urging further comprises said bellows.

2. A heat radiation control device according to claim 1, further comprising a spacer provided between said flange and said base plate such that said container is continuously positioned apart from said base plate.

3. A heat radiation control device according to claim 1, wherein said flange is located on one end of said container on a side of the base plate.

4. A heat radiation control device according to claim 1, wherein said means for fixing said radiating plate further comprises a spacer having a first end fixed to said base plate, said radiating plate including a recess formed therein extending toward said base plate and wherein a second end of said spacer is positioned within said recess.

5. A heat radiation control device according to claim 4, further comprising a film covering an entire outer surface of said radiating plate wherein said film further comprises a material for reflecting sunlight and radiating heat.

* * * * *